United States Patent [19]

Molho

[11] Patent Number: 5,764,986
[45] Date of Patent: Jun. 9, 1998

[54] METHOD FOR LOADING SECONDARY STATIONS WITH A STRUCTURE REPRESENTING INITIAL PROGRAM LOAD INFORMATION TO BE SENT IN A COMPUTER COMMUNICATION SYSTEM

[75] Inventor: Jacques Molho, Nice, France

[73] Assignee: International Business Machines Corp., Armonk, N.Y.

[21] Appl. No.: 294,767

[22] Filed: Aug. 23, 1994

Related U.S. Application Data

[63] Continuation of Ser. No. 773,172, Oct. 8, 1991, abandoned.

[30] Foreign Application Priority Data

Oct. 31, 1990 [EP] European Pat. Off. ............ 90480169

[51] Int. Cl.$^6$ .................... G06F 9/445; G06F 15/177
[52] U.S. Cl. .............. 395/700; 395/200; 364/DIG. 1; 364/280; 364/280.2
[58] Field of Search ................... 395/200, 725, 395/275, 325

[56] References Cited

U.S. PATENT DOCUMENTS

| | | | |
|---|---|---|---|
| 4,335,426 | 6/1982 | Maxwell | 395/725 |
| 4,491,914 | 1/1985 | Sujaku | 395/700 |
| 4,688,172 | 8/1987 | Wright | 395/700 |
| 4,752,870 | 6/1988 | Matsumura | 395/200 |
| 4,885,770 | 12/1989 | Croll | 379/269 |
| 4,888,683 | 12/1989 | Kolzumi et al. | 395/650 |
| 4,958,278 | 9/1990 | Meguro | 395/275 |
| 5,168,555 | 12/1992 | Byers | 395/325 |

FOREIGN PATENT DOCUMENTS 0270680  5/1986  European Pat. Off.

OTHER PUBLICATIONS

Patent Abstracts of Japan, vol. 8, No. 196 p. 299.
Patent Abstracts of Japan, vol. 8, No. 271, p. 320.

*Primary Examiner*—Paul V. Kulik
*Attorney, Agent, or Firm*—Joscelyn G. Cockburn

[57] ABSTRACT

The initialization method used in an information communication system including a main station (5) in operative state connected through a transportation way (TW3) to N secondary stations 7 which are to be initialized by the main station, comprises the step of sending to each secondary station to be initialized a set of messages comprising initialization program modules common to all secondary stations and specific messages containing initialization code modules specific to each station and a table dedicated to each station representative of the set of messages.

15 Claims, 6 Drawing Sheets

CUSTOMIZATION TABLE

| TYPE AND NUMBER OF THE SECONDARY STATION | | | | | | | | | |
|---|---|---|---|---|---|---|---|---|---|
| COMMON-1 (CONTROL PROGRAM) | Y | N | 2 | 3 | 4 | 5 | 6 | 7 | |
| COMMON-2 INSTALLATION OF THE CONTROL PROGRAM | Y | Y | 8 | 9 | | | | | |
| COMMON-3 DIAGNOSTICS | Y | Y | 10 | 11 | 12 | | | | |
| SPECIFIC-1 | N | N | 13 | 14 | | | | | |
| SPECIFIC-2 | Y | N | 15 | | | | | | |
| SPECIFIC-3 | N | N | 16 | 17 | 18 | | | | |
| SPECIFIC-4 | N | N | 19 | 20 | | | | | |

23

MODULE NAME | TRANSFER FROM A1 TO A2 (Y/N) | PROGRAM ACTIVATION IN A2 (Y/N) | MESSAGE NUMBERING (IN PROTOCOL) AS THIS TABLE IS THE FIRST MESSAGE, IT HAS THE NUMBER 1

FIG. 5
CUSTOMIZATION TABLE

| MODULE NAME | TRANSFER FROM A1 TO A2 (Y/N) | PROGRAM ACTIVATION IN A2 (Y/N) | \multicolumn{7}{c}{TYPE AND NUMBER OF THE SECONDARY STATION} |
|---|---|---|---|---|---|---|---|---|---|
| | | | 2 | 3 | 4 | 5 | 6 | 7 | |
| COMMON-1 (CONTROL PROGRAM) | Y | N | | | | | | | |
| COMMON-2 INSTALLATION OF THE CONTROL PROGRAM | Y | Y | 8 | 9 | | | | | |
| COMMON-3 DIAGNOSTICS | Y | Y | 10 | 11 | 12 | | | | |
| SPECIFIC-1 | N | N | 13 | 14 | | | | | |
| SPECIFIC-2 | Y | N | 15 | | | | | | |
| SPECIFIC-3 | N | N | 16 | 17 | 18 | | | | |
| SPECIFIC-4 | N | N | 19 | 20 | | | | | |

MESSAGE NUMBERING (IN PROTOCOL) AS THIS TABLE IS THE FIRST MESSAGE, IT HAS THE NUMBER 1

METHOD FOR LOADING SECONDARY STATIONS WITH A STRUCTURE REPRESENTING INITIAL PROGRAM LOAD INFORMATION TO BE SENT IN A COMPUTER COMMUNICATION SYSTEM

CROSS REFERENCE TO RELATED APPLICATION

This application is a continuation of application Ser. No. 07/773,172, filed Oct. 8, 1991, now abandoned.

FIELD OF THE INVENTION

The present invention relates to a decentralized information processing system and a method for initial program loading (IPL) of secondary stations by a main station.

BACKGROUND OF THE INVENTION

Distributed information systems including a main station and several secondary stations are already known. A system of the prior art is shown in U.S. Pat. No. 4,752,870. According to the IPL method described therein, at the time of set-up of one of the work stations, a request for initial program loading is issued from said one of the work stations and a search is made by the system controller or main station, among the secondary stations, in order to determine if at least one of the secondary stations has completed its IPL. If such a station exists, it transfers an IPL program to said one of the work stations which has issued the request for IPL.

The method of the prior art has the advantage to render superfluous the storage of the IPL program within the system controller, as soon as at least one secondary station has been initialized, which leads to less memory waste within said system controller.

However, the known method has also a correlative drawback, in that the information transmitted from one already initialized station to another still not initialized station cannot include station-customized data and/or program.

Further, the method described in the prior art renders compulsory the sending of IPL requests and acknowledgements to the system controller, which impedes the performance of the IPL method.

SUMMARY OF THE INVENTION

An object of the present invention is to eliminate the above cited drawbacks. Therefore, in an information communication system including a main station in operative state connected through a transportation way to a plurality of N secondary stations which are to be initialized by said main station, an initialization method is provided which comprises the step of sending to each secondary station to be initialized, a set of messages comprising at least one program module and/or data including at least one table dedicated to each secondary station, said table being representative of the structure of the set of messages.

According to a preferred embodiment of the invention, said set of messages includes initialization program modules CM that are common to all the secondary stations.

Further according to the invention, said set of messages includes specific messages SMi containing initialization code modules that are specific to each secondary station.

The main advantages of the claimed method according to the invention are that the program loading phase becomes a very small contributor to the overall system initialization time, and that the system (for example a communications controller) has an excellent availability rate, since complete or partial initialization or re-initialization can be done in a very short time, leaving the system operational over a maximal time range.

More specifically, another important advantage of the method according to the invention is that several secondary stations may be initialized with a customized program or data, without need for acknowledgements to be sent to the main station.

BRIEF DESCRIPTION OF THE DRAWINGS

In the accompanying drawings,

FIG. 5 represents a customization table according to which station-customized initialization messages are sent to the various secondary stations.

DETAILED DESCRIPTION OF THE INVENTION

Figure 1:
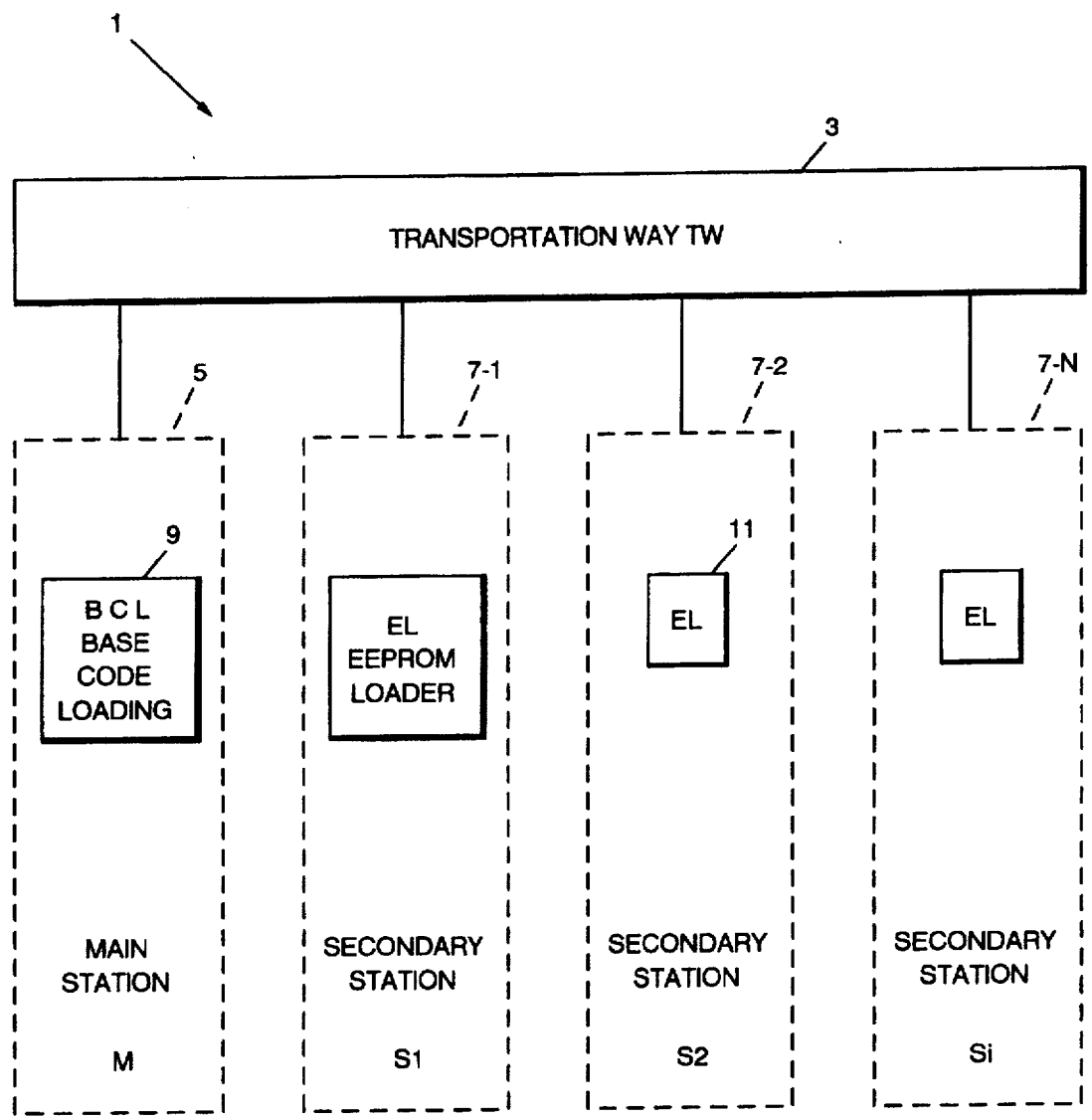
FIG. 1 is a block diagram representing the environment in which the method according to the invention may be used.

FIG. 1 represents the general structure of a communication system (1) in which the method according to the invention may be used. Although this is not compulsory, the communication system (1) can be a part of a communications controller, the stations (5,7) being in this case the line interface modules of said communications controller. But the invention may be generalized and used in any communication system presenting the structure represented in FIG. 1.

The communication system represented in FIG. 1 comprises a main station (5) which is supposed in operative state, and N secondary stations (7 numbered 7-1 to 7-n) connected thereto through a transportation way TW(3) of any type.

Since the hardware structure of the stations and of the transportation way is not critical for the implementation of the method according to the invention, it is not described in detail. However, a functional description of the elements, in the main station 5, which are related to the invention will be given hereafter.

Figure 6:
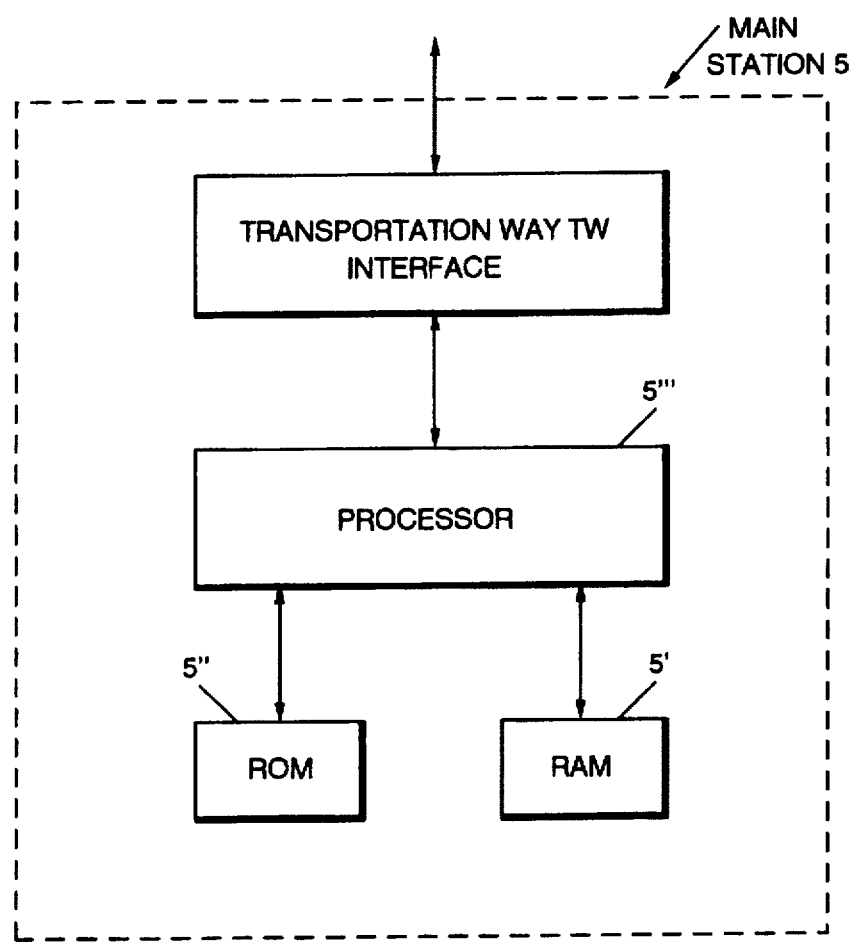
FIG. 6 represents a block diagram of the main station.

The main station (5) FIG. 6 is supposed to include a storage (RAM memory) 5' containing various data necessary for the initialization of the secondary stations, and a software component called Base Code Loading (BCL) residing in ROM 5". The function of this software component is to get information (code modules and data) from the memory 5' of the main station and to transmit it to the various secondary stations. A processor 5'" executes the BCL code and moves the initialization information from the RAM memory through the transmission way interface and TRANSMISSION WAY TW 3 to the secondary stations.

According to the invention, each secondary station (7) contains an EEPROM memory (not represented in FIG. 1) wherein a software component called EEPROM Loader (EL) is loaded during manufacturing (when flash EEPROM). Thus, EL represents the minimum of "intelligence" necessary to perform the loading into the EEPROM of the information provided by the main station during the IPL phase.

For performing the IPL method according to the invention, the assumption is made that the code and data that are to be sent from the main station to the secondary stations through the transportation way (3) are already in the main station storage. The BCL component of the main station takes this code/data and prepares all the messages that will be sent to all the secondary stations for the purpose of their initialization.

Thus, the implementation of the IPL method according to the invention will cause the secondary stations to pass from a wait mode state wherein the EL code alone is active and waits for data coming from the main station, to a final state wherein the secondary stations are fully loaded with the initialization code/data necessary to render them fully operational.

In order to remedy the drawbacks stated previously, the method according to the invention includes steps for sending different types of information to the different secondary stations, according to a pre-established schedule.

Therefore, the information to be sent to the secondary stations by BCL active in the main station, is partitioned into common messages (CM) which are messages to be sent to all the secondary stations, specific messages (SMi)(i between 1 and N) which are individualized messages needed by the stations for IPL purposes, and a table Ti (i between 1 and N) containing the structure of the information to be sent to each specific secondary station.

Figure 3:
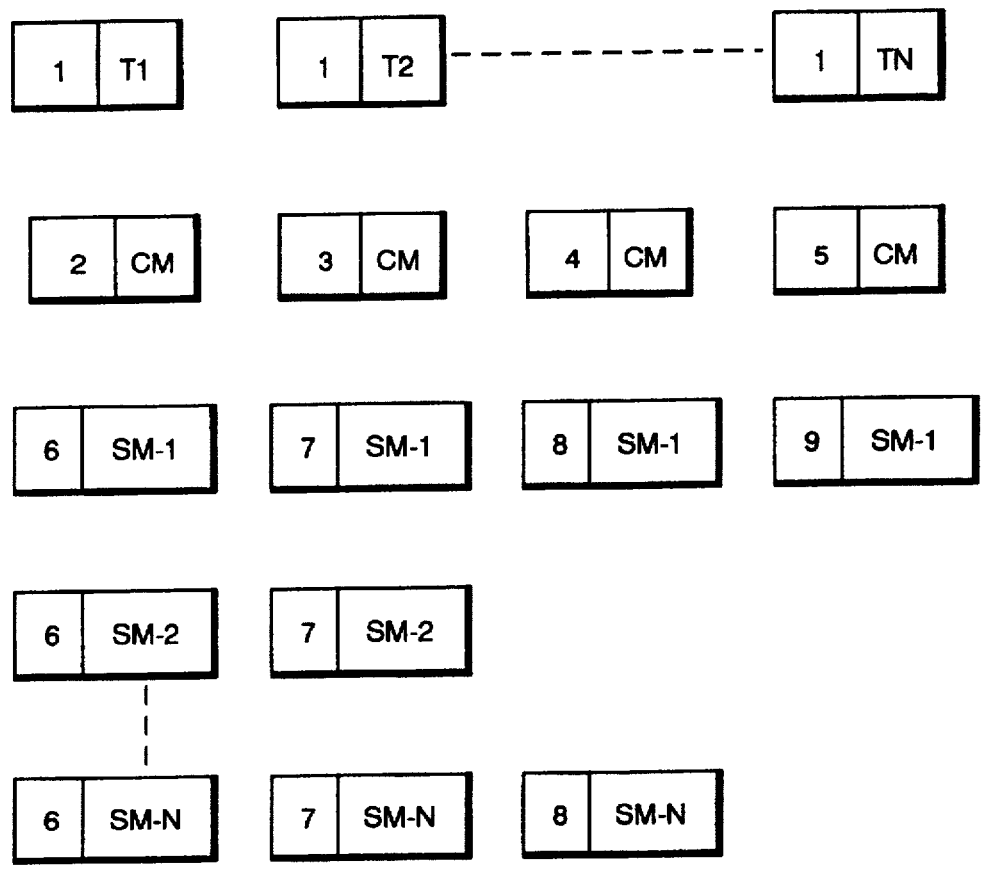
FIG. 3 shows the organization of the messages within the memory of the main station once they are ready to be sent.

FIG. 3 represents schematically the composition of a set of messages prepared by BCL and stored within the memory of the main station. This set of messages is ready to be sent to the secondary stations (7) and consists of tables T1 to TN, common messages CM and specific messages SMi where i represents the number of the destination secondary station. In the example represented, which is not limitative, four common messages (referenced 2 to 5) are to be sent to all the secondary stations. Further, four specific messages (referenced 6 to 9) are ready to be sent to station 1, two specific messages (referenced 6 to 7) are ready to be sent to station 2, etc . . . .

Among the messages sent to a given station, the first one is a table dedicated to that given station. This table contains information that announces the structure of the remaining IPL information to be sent to that station, in order for the EEPROM loader program of that station to load and recognize said IPL information. An example of such a table is shown in FIG. 5, and will be described farther.

According to the method of the invention, the BCL component sends all the messages to the first secondary station S1 and then starts a timer for S1.

Then BCL sends all the S2 IPL messages to S2 and starts a timer for S2. The same process is repeated for all the secondary stations, and consequently the sending is done without expecting an aknowledgement after each message, and an acknowledgement is provided by a secondary station only once after all the messages have been sent by BCL to that given station.

After the sending of the last message to a given secondary station, BCL starts a timer for this secondary station for the following reasons: EL can send back BCL four classes of messages (EL process OK, Send messages again, Locking error found in EL process, Non locking error found in EL process); depending on the EL message, BCL either sets a loading status (OK, KO) for said secondary station, or sends again some messages that have not been correctly received by EL. The EL messages are taken into account by BCL while the timer has not expired; but, at expiration of timer, if no EL message has been received by BCL, then BCL can either perform a retry—sending base code again—(a maximum number of retries has been already defined), or set the said secondary station in loading status KO.

Figure 4:
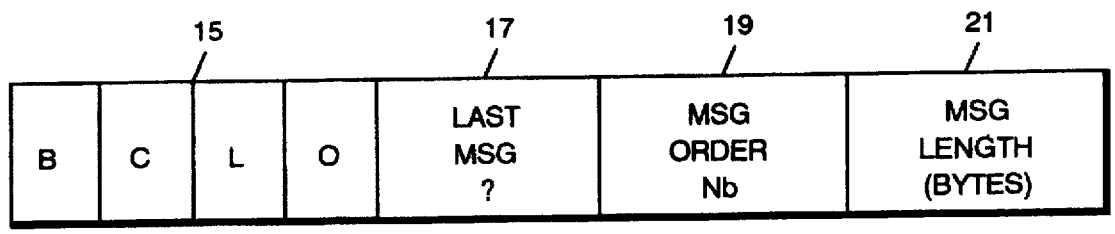
FIG. 4 shows the control pattern of each initialization message.

In order to determine the right moment to issue acknowledgements (from EL point of view), each message is preceded by a header represented in FIG. 4. This header includes a first indicator (15) BCLO (BCL Origin) used to check that the current message is originated by the BCL software component of the main station (5), and by no one else. The header includes a second indicator (17) for checking if the current attached message is the last message due to a given secondary station. A third indicator (19) indicates the rank of the attached message among the series of messages sent to a given secondary station and a fourth indicator (21) is used for giving the number of significant bytes of the attached message.

Figure 2:
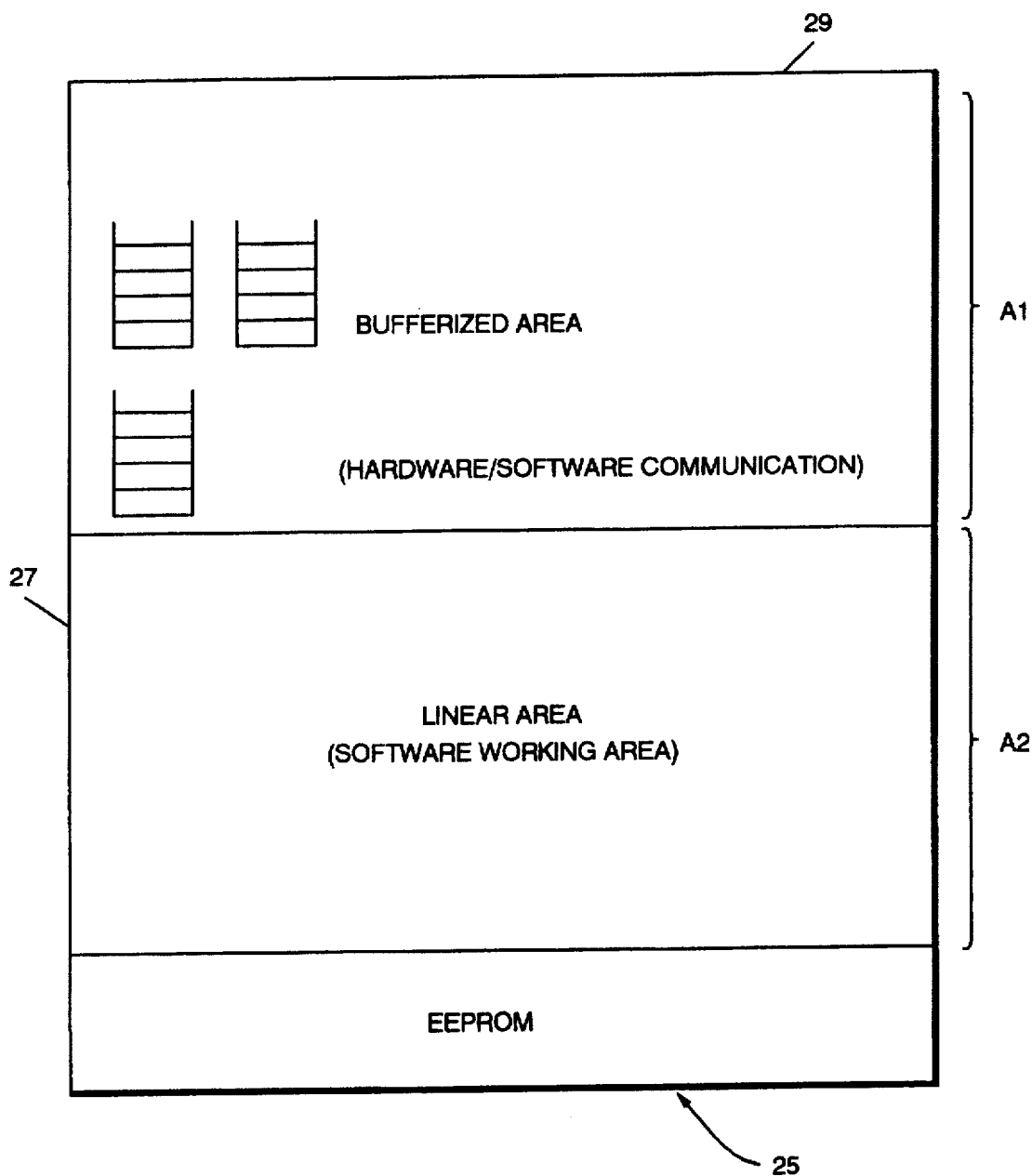
FIG. 2 shows the memory structure of a given secondary station.

The memory structure of a station (primary or secondary), shown in FIG. 2, is composed of 3 parts: an EEPROM part (25), flashed at manufacturing with EEPROM code, a bufferized area A1 (29) which is the communication area between hardware levels and software ones, and a linear area A2 (27) which is the software working area (it contains the software codes and associated data).

Figure 7:
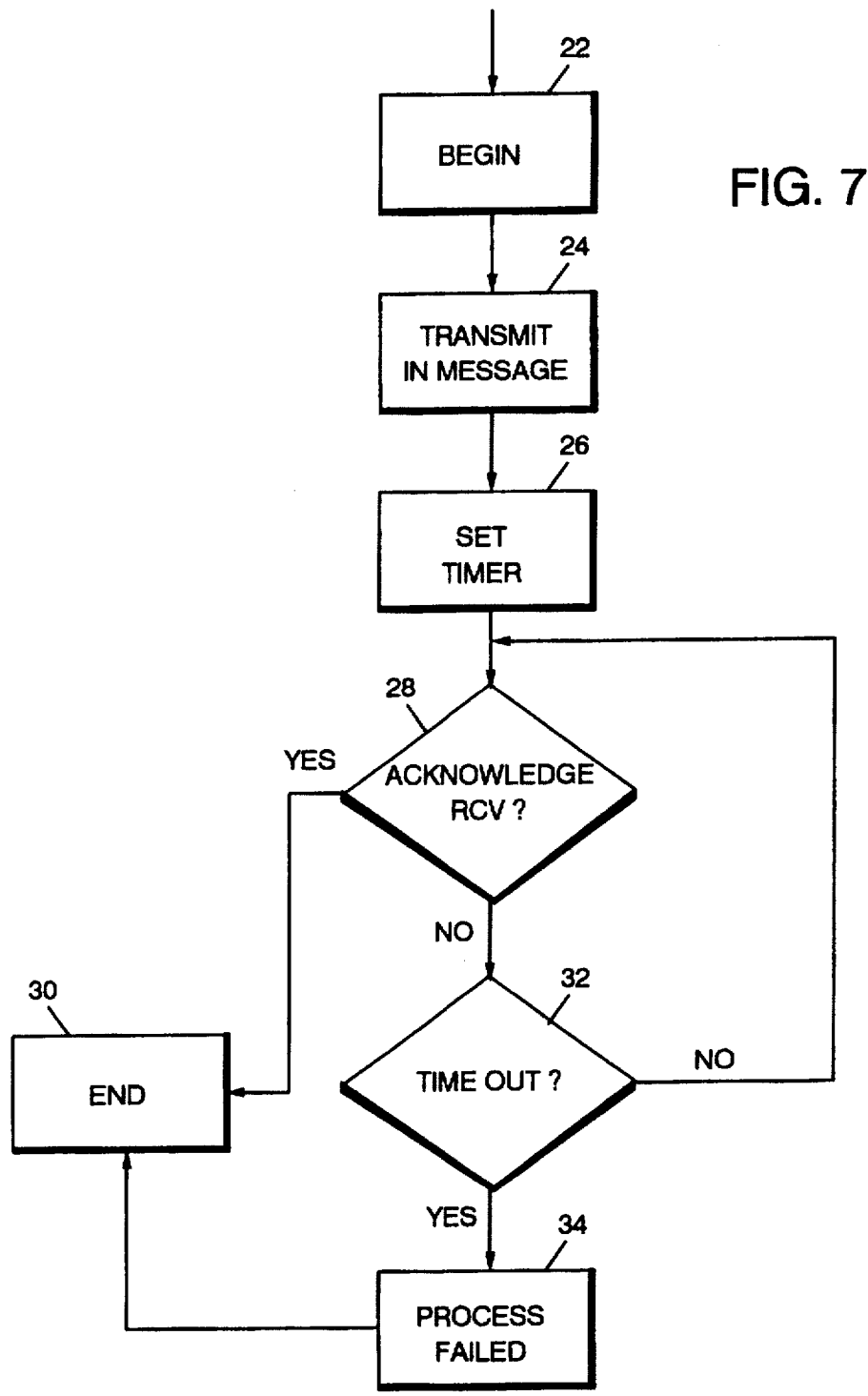
FIG. 7 represents a process flow chart of the main station.

The customization table (23) described in FIG. 5 is dedicated to a given Si secondary station. It contains the list of pieces of code/data that are to be sent to Si, and for each of these pieces, the following information is described: name of the piece, an indication whether this piece is to be transferred from A1 area (29) to A2 area (27) and an indication whether this piece is to be activated within A2 area (27), is this piece to be activated within A2 area (27), and at least, the numbering (following BCL/EL protocol) of the messages that constitute the piece. FIG. 7 represents a flow chart of the process in the main station 5 for loading initialization information from the main station to the secondary station. The processor begins at step 22 and descends into step 24 where it transmits (xmit) the initialization message (IN. MESG.) to a secondary station. The processor then sets a timer (step 26) and descends into step 28. In step 28 the processor waits to receive (RCV.) the acknowledge (ACK.) signal from the secondary station. If the acknowledge signal is received, the process is ended (step 30). If the acknowledge signal from the end station is not received, the processor enters step 32 where it checks if the predetermined time set in step 26 has expired (time out). If the time out has expired, the processor enters step 34 where it flags the condition as failed and ends the process in step 30. If the time out has not occurred in block 32, the processor loops and executes the steps previously described.

I claim:

1. In an information communication system including a main station (5) in operative state connected through a transportation way TW(3) to a plurality of N secondary stations Si(7) which are to be initialized during an initialization phase by said main station, an initialization method comprising the steps of: sending to a secondary station Si(7) to be initialized, a set of messages comprising at least one program module and data including at least a table Ti(23) dedicated to said secondary station, said table containing information being representative of the structure of a set of messages to be sent from said main station to the secondary station during said initialization phase.

2. A method according to claim 1, wherein said set of messages includes initialization program modules CM that are common to all the secondary stations.

3. A method according to claim 1, wherein said set of messages includes specific messages SMi containing initialization code modules that are specific to each secondary station.

4. A method according to claim 1, wherein said set of messages includes both a table Ti dedicated to each secondary station, common initialization code modules CM and specific initialization code modules SMi.

5. A method according to claim 4, wherein, upon completion of the transmission of all the messages (Ti, CM, SMi) to a given secondary station, a timer is started for that given secondary station Si.

6. A method according to claim 4, wherein, prior to their sending to the secondary stations (7), the initialization code and/or data messages are prepared by a software component BCL(9) and stored within a memory in the main station (5).

7. A method according to claim 4, wherein each secondary station (7) contains an EEPROM memory (25) and a piece of software EL(11) for loading the Ti, CM and SMi messages sent by said main station.

8. A method according to claim 6, wherein each one of said set of messages contain a header including:

a first indicator (15) for indicating that said message is originated by said software component BCL of the main station;

a second indicator (17) for indicating if the current attached message is the last message due to a given secondary station;

a third indicator (19) giving the rank of the attached message among the series of messages sent to a given secondary station; and a fourth indicator (21) for giving the number of significant bytes of said message.

9. The method of claim 1 wherein the table Ti(23) is a first message from the main station to the secondary station.

10. The method of claim 1 wherein the data structure of the Initial Program Load information in the table includes type and number of the secondary station, a list of pieces of code/date that are to be sent to the secondary station, with a name of each piece, is this piece to be transferred from A1 area (29) to A2 area (27), is this piece to be activated within the A2 area (27) and at least numbering of the messages constituting the piece.

11. In an information communication system including a main station (5) in operative state connected through a transportation way TW(3) to a plurality of N secondary stations Si(7) which are to be initialized by said main station, an initialization method comprising the steps of:

providing in each of the secondary stations a piece of software EL(Si) allowing said station to receive messages from the main station, during an initialization phase;

sending to each secondary station Si(7) to be initialized, a set of messages comprising at least one program module and data including at least a table Ti(23) dedicated to each of said secondary stations, said table information being representative of the structure of a set of messages to be sent from said main station to the secondary station during said initialization phase; and sending, by said each secondary station, one acknowledgement indicating receipt of the set of messages by said each secondary station.

12. In an information communication system including a main station (5) in operative state connected through a transportation way TW(3) to a plurality of N secondary stations Si(7) which are to be initialized by said main station, an initialization method comprising the steps of:

providing in each secondary station a piece of software EL(Si) allowing said station to receive messages from the main station, during an initialization phase;

sending to each secondary station Si(7) to be initialized, a set of messages comprising at least one program module and data including at least a table Ti(23) dedicated to each of said secondary stations, said table containing information representing a data structure of Initial Program Load (IPL) information to be sent from said main station to the secondary station during said initialization phase; and sending, by each said secondary station, one acknowledgement indicating receipt of the set of messages by said each secondary station.

13. In an information communication system including a main station (5) in operative state connected through a transportation way TW(3) to a plurality of N secondary stations Si(7) which are to be initialized by said main station, an initialization method comprising the steps of:

providing in each secondary station a piece of software EL(S) allowing said station to receive messages from the main station, during an initialization phase;

receiving from the main station (5) in each secondary station Si(7) to be initialized, a set of messages comprising at least one program module and data including at least a table Ti(23) dedicated to each of said secondary stations, said table containing information being representative of the structure of a set of messages to be sent from said main station to the secondary station during said initialization phase; and sending, by said each secondary station, one acknowledgement indicating receipt of the set of messages by said each secondary station.

14. In an information communication system including a main station (5) in operative state connected through a transportation way TW(3) to a plurality of N secondary stations Si(7) which are to be initialized by said main station, an apparatus for initializing each of said N secondary stations Si(7) comprising means in said main station for sending a set of messages comprising at least one program module and data including at least a table Ti(23) dedicated to each of said secondary stations, said table containing information representing a data structure of Initial Program Load (IPL) information to be sent from said main station to the secondary station during said initialization phase.

15. An information communication system comprising a main station (5) in operative state connected through a transportation way TW(3) to a plurality of N secondary stations Si(7) which are to be initialized during an initialization phase by said main station, an initialization means provided in the main station for generating and sending to at least one of the secondary stations Si(7) to be initialized, a set of messages comprising at least one program module and data including at least a table Ti(23) dedicated to the at least one of said secondary stations, said table containing information representing a data structure of Initial Program Load (IPL) information to be sent from said main station to the at least one of the secondary stations during said initialization phase.

* * * * *